(12) United States Patent
Houliston et al.

(10) Patent No.: US 9,720,670 B2
(45) Date of Patent: Aug. 1, 2017

(54) DEPLOYING SOFTWARE IN A COMPUTER NETWORK

(71) Applicant: 1E Limited, London (GB)

(72) Inventors: Marc Houliston, London (GB); Lee Gallington, London (GB)

(73) Assignee: 1E Limited, London (GB)

( * ) Notice: Subject to any disclaimer, the term of this patent is extended or adjusted under 35 U.S.C. 154(b) by 0 days.

(21) Appl. No.: 14/738,267

(22) Filed: Jun. 12, 2015

(65) Prior Publication Data

US 2015/0363178 A1    Dec. 17, 2015

(30) Foreign Application Priority Data

Jun. 13, 2014    (GB) .................................. 1410634.8

(51) Int. Cl.
*H04W 4/20*     (2009.01)
*G06F 9/445*    (2006.01)
*G06F 1/32*     (2006.01)

(52) U.S. Cl.
CPC .............. *G06F 8/60* (2013.01); *G06F 1/3209* (2013.01); *H04W 4/20* (2013.01)

(58) Field of Classification Search
CPC ........... G06F 8/60; G06F 1/3209; H04W 4/20
See application file for complete search history.

(56) References Cited

U.S. PATENT DOCUMENTS

| 5,915,119 A | 6/1999 | Cone |
| 7,362,758 B2 | 4/2008 | Chang et al. |
| 8,099,479 B2 | 1/2012 | Saint-Hilaire |
| 8,452,848 B1* | 5/2013 | Satish ............... H04W 52/0203 709/217 |
| 2004/0254978 A1 | 12/2004 | Ibanez et al. |
| 2008/0155245 A1 | 6/2008 | Lipscombe et al. |
| 2012/0191835 A1* | 7/2012 | Blackburn .......... H04L 67/1002 709/223 |
| 2014/0215197 A1 | 7/2014 | Murray et al. |
| 2014/0237468 A1* | 8/2014 | Desai .................... G06F 9/5083 718/1 |
| 2014/0366042 A1* | 12/2014 | Chan .................... G06F 9/4825 719/318 |

* cited by examiner

*Primary Examiner* — Charles E Anya
(74) *Attorney, Agent, or Firm* — EIP US LLP

(57) ABSTRACT

A central server in a network stores, or has access to, data relating to software stored on computers in subnets of the network. The central server is able to designate a computer in each subnet as a wake-up master for that subnet. The wake up master maintains an awoken state and is able to issue a wakeup signal to any computer designated by the central server in the subnet. A computer in a subnet requesting software from another computer in the subnet, but unable to find it because the other computer may not be awake, issues a request to the central server. The central server identifies a computer in the subnet likely to have the software and causes the wake-up master of the subnet to wake up the identified computer so the requesting computer can communicate with, and download, the requested software from the identified computer.

10 Claims, 3 Drawing Sheets

DEPLOYING SOFTWARE IN A COMPUTER NETWORK

CROSS-REFERENCE TO RELATED APPLICATIONS

This application claims priority to United Kingdom Patent Application No. GB 1410634.8, filed Jun. 13, 2014, the entire disclosure of which is hereby incorporated by reference.

BACKGROUND OF THE INVENTION

Field of the Invention

The present invention relates to a computer network, and to deploying software to computers in a network.

Description of the Related Technology

NOMAD® is an existing product available from 1E Limited and which enables efficient deployment of software packages to computers in subnets of a network, for example a Local Area Network (LAN) or a Wide Area Network (WAN). NOMAD together with PXE Everywhere allows the supply of Operating Systems. Other products are available from other suppliers to deploy software packages across a network.

NOMAD designates one or more computers in a subnet to act as a download master which obtains and stores packages for supply to other computers in the subnet. That avoids downloading across the network to each of the computers in each subnet reducing network traffic. A computer requiring a package initiates an election to determine which other computer can provide the software. A computer having the package is the download master and the requesting computer downloads the package from it.

NOMAD or another package supply arrangement may fail to find a package. One reason for failure is computers have power state control systems which automatically reduce power consumption by placing them in reduced power conditions (powered down). Those reduced power conditions may be variously referred to as "off", "standby" "sleep", "hibernate", in which computers do not respond to communications from other computers. An example of such a power state control system is the Advanced Configuration and Power Interface (ACPI).

A computer requesting a package, using a package supply arrangement, from another computer which is powered down, is not able to download the package from the other computer even if the other computer has the package.

SUMMARY

In accordance with a first embodiment of the invention, there is provided a computer network comprising: one or more subnets, each subnet comprising a plurality of computers, and a computer arrangement connected by the network to the subnets and configured to respond to a request, from a computer in the one or more subnets, for the provision of content, wherein each of the computers in the subnets is configured to respond to an wake-up signal to transition the computer from a non-active power state to an active power state, and has program code which enables the computer to: issue a request to the computer arrangement for the provision of content, and communicate with another computer on the same subnet or another subnet selectively to receive requested content therefrom or provide requested content thereto, and wherein the computer arrangement has program code which enables the computer arrangement to: respond to a request from a computer in a subnet for the provision of content with an indication of at least one other computer, the other computer being identified as having the content and being communicatively-coupled to the computer requesting the content, and cause a wake-up signal to be sent to that other computer.

In accordance with a second embodiment of the present invention, there is provided a non-transitory computer-readable medium storing a set of instructions executable by a processing resource of a computer, the computer residing in a computer network having: one or more subnets, each subnet comprising a plurality of computers; and a computer arrangement connected by the network to the subnets and configured to respond to a request, from a computer in the one or more subnets, for the provision of content; the instructions being configured to, when executed by the processing resource, cause the computer to: i) respond to a wake-up signal to transition the computer from a non-active power state to an active power state, ii) respond to an instruction from the computer arrangement to act as a wake up master which maintains an active power state and to issue a wake-up signal to a computer designated by the computer arrangement, iii) issue a request to the computer arrangement for the provision of content, and iv) communicate with another computer on the same subnet or another subnet selectively to receive requested content therefrom or provide requested content thereto.

In accordance with a third embodiment of the present invention, there is provided a non-transitory computer-readable medium storing a set of instructions executable by a processing resource of a computer arrangement in a computer network having one or more subnets, each subnet comprising a plurality of computers, the computer arrangement being connected by the network to the subnets, the instructions being configured to, when executed by the processing resource, cause the computer arrangement to: respond to a request from a computer in a subnet for the provision of content to indicate to the computer at least one other computer which is identified as having the requested content and to cause a wake-up signal to be sent to that other computer, the wake-up signal being configured to transition the other computer from a non-active power state to an active power state.

In accordance with a fourth embodiment of the present invention, there is provided a method of provisioning content across a network comprising: determining whether content is available within one or more subnets, each subnet comprising a plurality of computers; responsive to content being unavailable within the one or more subnets, sending a request to a computer arrangement for provision of the content; responsive to the request, sending an indication from the computer arrangement of at least one computer within the one or more subnets that is identified as having the content, and sending a wake-up signal to said at least one computer, the wake-up signal being configured to transition the other computer from a non-active power state to an active power state.

BRIEF DESCRIPTION OF THE DRAWINGS

Further features and advantages of the invention will become apparent from the following description of illustrative embodiments of the invention, given by way of example only, which is made with reference to the accompanying drawings.

DETAILED DESCRIPTION OF CERTAIN INVENTIVE EMBODIMENTS

A Network

Figure 1:
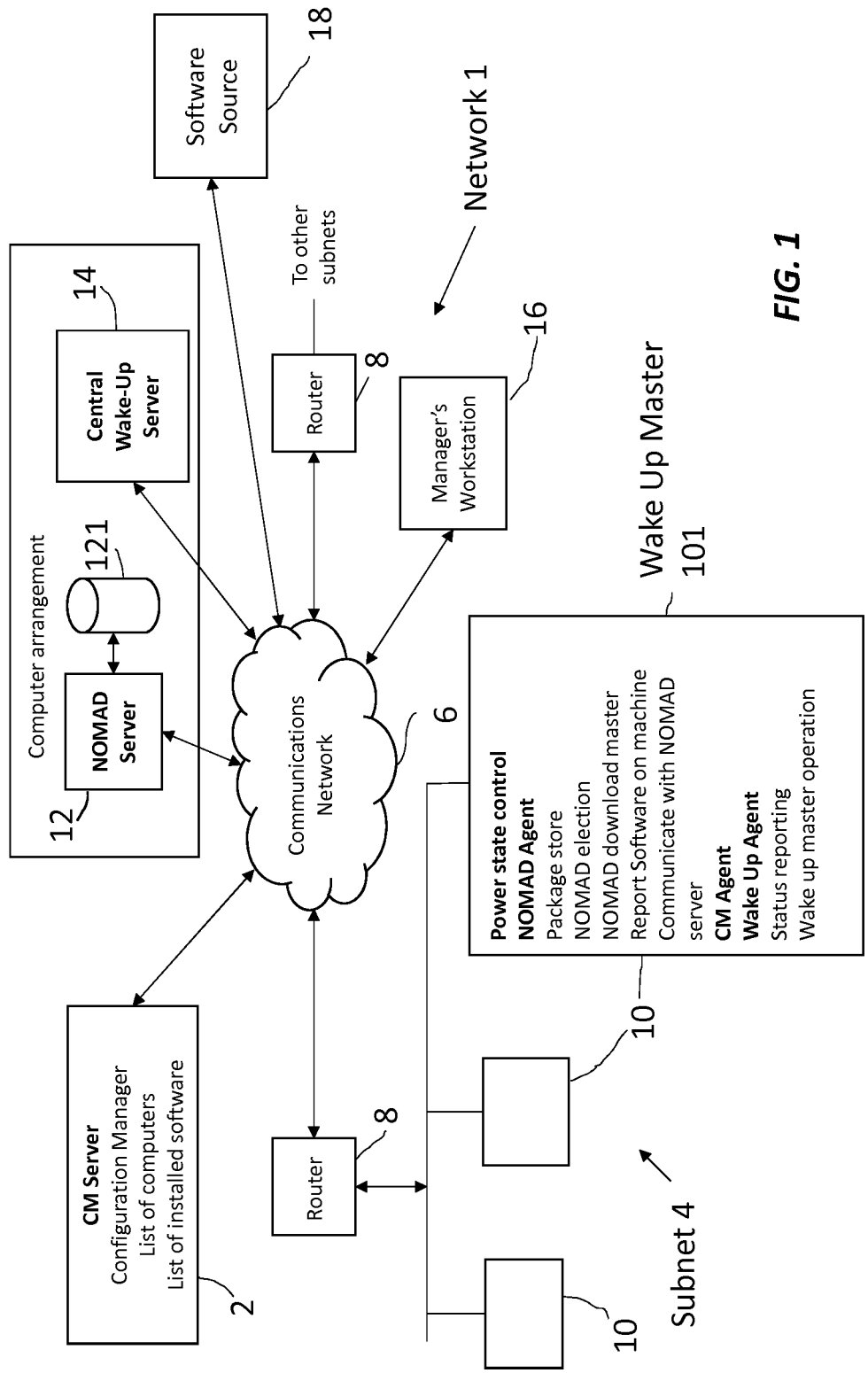
FIG. 1 is a schematic diagram of an illustrative computer network.

FIG. 1 illustrates an example of a network 1, for example a wide area network (WAN) or Local area network (LAN) in which the present invention may be used, but those skilled in the art will appreciate the invention may be used in other networks. The network may be a private or corporate network. It may be connected to one or more other networks.

The network of FIG. 1 comprises a network management system, in this example a Microsoft Configuration Manager (CM) 2 coupled to one or more sub-networks or network branches 4 by a communications network 6 via one or more routers 8. Each sub-network 4 comprises one or more computers 10. Other examples of network management systems are available from other companies. The computers 10 may be of different types for example desk top computers, laptops, servers, work stations, and portable hand-held computing devices such as mobile telephones amongst others. Portable computers such as laptops may be connected to the network only temporarily.

Each computer 10 has at least an operating system, applications software and a CM agent. The CM agent communicates with the CM 2 informing the CM 2 in known manner of software installed on the computer. Software may be installed on a computer 10 using for example a Configuration Manager or another installation system. Software may also be installed on a computer 10 by the user if the user has administrator rights which allow that. The Configuration Manager CM 2 stores data relating to the computers 10 and the software installed on them including data identifying the computers, data identifying the software, including patches, installed on them, and other data as will be described in more detail below. One or more manager's workstations 16 may be in the network.

The network of FIG. 1 also includes a computer arrangement comprising a computer 12 which, in this example is a central NOMAD server 12 as will be described in more detail below and a computer 14, for example a server, which is a central wake-up server 14 as will be described in more detail below. It will be appreciated that the services and functions of the two computers 12 and 14 may be carried out by a computer arrangement having a single computer; however the following description assumes the servers 12 and 14 are separate and provide different services and functions. The NOMAD server 12 may have a database 121 to store data relating to the subnets, the computers in the subnets and the software stored on them. The network 1 of FIG. 1 is in a domain. The servers 12 and 14 may be inside or outside the domain. The servers 12 and 14 may be operated by an organisation independent of the owners of the domain.

The network includes, or is connected to, a source 18 of software.

A Computer of the Network

Figure 2:
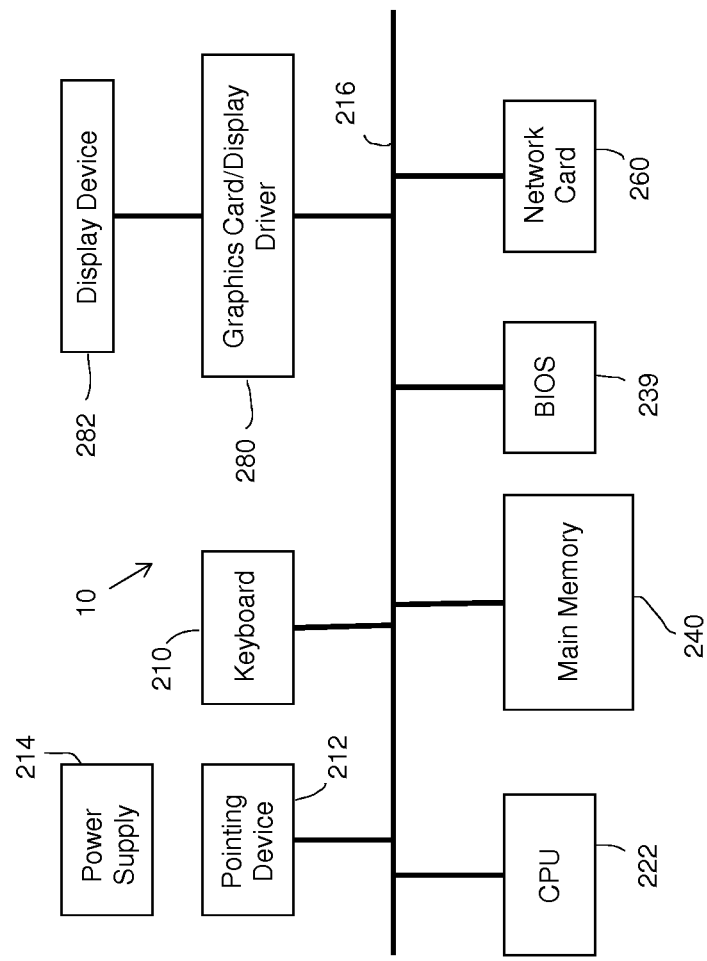
FIG. 2 is a schematic diagram of an illustrative computer of the network of FIG. 1.

Referring to FIG. 2, an illustrative one of the computers 2, 10, 12, 14 and 16 comprises, amongst other items: a CPU 222; a main memory 240 for example a hard disk drive or other storage device, for example electronic memory; a network interface 260; a Basic Input/Output System (BIOS) 239; and one or more buses 216. The BIOS 239 is typically a Read Only Memory (ROM). The computers may also have other items for example a display driver 280 coupled to a display device 282; human interface devices or input devices for example a keyboard 210 and a pointing device 212. The items are conventional and interact via the bus(es) 216 in a conventional way. The network interface couples the computer to the communications network 6 via the routers 10 and to other computers in the sub-network 4 having respective IP (Internet Protocol) addresses. The computer also comprises a power supply 214. Programs are stored in the main memory 240 and executed by the CPU 222.

Network Card

Each computer 10 in a subnet has a power state control system for example ACPI (Advanced Configuration and Power Interface) which specifies various power states, of which states S1, S3 and S4 are:

S1, Power on Suspend (POS): All the processor caches are flushed, and the CPU(s) stops executing instructions. The power to the CPU(s) and RAM is maintained. Devices that do not indicate they must remain on, may be powered off.

S3, commonly referred to as Standby, Sleep, or Suspend to RAM (STR): RAM remains powered.

S4, Hibernation or Suspend to Disk: All content of the main memory is saved to non-volatile memory such as a hard drive, and is powered down.

A computer in one of those states S1, S3 and S4 does not respond to communications from other computers.

Each computer 10 in a subnet 4 has a network card acting as the network interface 260. The card is a hardware device within the computer that is configured to wake it up from a non-awake state in response to a wake up signal which in this example is a particular form of packet referred to as a 'magic packet'. A magic packet is well known and is a broadcast frame containing anywhere within its payload 6 bytes all of value 255 (FF FF FF FF FF FF in hexadecimal), followed by sixteen repetitions of the target computer's 48-bit MAC address, for a total of 102 bytes. It will be appreciated that other means of controlling the power state of a computer across a network may be used, for example Intel's vPro or any other suitable technology. In general, a wake-up signal will transition a computer in a non-active power state (e.g. S1, S3 and S4) to an active power state where the computer can respond to communications from other computers.

Overview: An Example of a Method of Downloading Software

Assume that a computer in a subnet has software needed by another computer 10 which requests a download of the software, but the computer having the software is not awake. The NOMAD server 12 stores, or has access to, data relating to software stored on computers in subnets of the network and the subnet having those computers. The central wake-up server 14 is able to designate any one of the computers 10 in each subnet 4 as a wake-up master 101 for that subnet. The wake up master 101 maintains an awoken state; it does not adopt a powered down state, and is able to issue a wakeup signal to any computer 10 in the subnet 4 designated by the central wake-up server 14. A computer 10 in a subnet 4 requesting software from another computer in the subnet, but unable to find it because the other computer is not awake, issues a request to the NOMAD server 12. In one example, the NOMAD server 12 identifies a computer 10 in the subnet likely to have the software and instructs the Central Wake-Up server 14 to instruct the wake-up master 101 of the subnet 4 to wake up the identified computer 10 using the magic packet so the requesting computer can communicate with, and download, the requested software from the identified computer. In another example, the NOMAD server 12 may identify a computer in a subnet different to the one containing the requesting computer 10 as likely to have the requested software. Preferably the two subnets are at the same physical site or are otherwise closely connected in a way allowing computers on the two subnets to communicate.

NOMAD Agents

The overview above assumes that the required software is available in the subnet 4. In an example the software is provided to the subnet in the following way using NOMAD® software which is available from 1E Limited.

For example, whenever a NOMAD agent, e.g. running on a computer 10 in a subnet, requires any content, it initiates an election to dynamically determine where the content should be obtained from. The election may be in the form of a subnet broadcast, wherein all other NOMAD agents on the local subnet receive the broadcast and check their own cache to see whether they have a copy of the requested content. If a NOMAD agent does have the content cached, then it may become a download master, e.g. an elected computer that is used to retrieve the content, and the requesting NOMAD agent retrieves the content from the download master. If several NOMAD agents in the subnet have the content cached, then one of them may be elected as a download master based on one or more weighting criteria (e.g. proximity to the requesting agent, available bandwidth, available processing resources etc). If no NOMAD agent within the subnet has the content cached, and/or if certain NOMAD agents only have a partial cache of the content, then a download master is elected based on one or more weighting criteria (e.g. percentage of the requested content that is already cached as well as those previously mentioned). The elected download master then proceeds to download the content from outside the subnet, e.g. from software source 18, which may be a Configuration Manager Distribution Point and/or which may be coupled to the download master via a WAN rather than a LAN.

In one case, as the download master downloads content from outside the subnet to its cache, one or more other NOMAD agents on the subnet in turn download the content from the cache of the download master to their own cache. This means that if, for some reason, the download master is not able to continue the download, e.g. gets disconnected or switched off, then another election is performed amongst the other NOMAD agents and a new download master is selected. This new download master can then resume the download according to the percentage of content copied to its own cache.

In one case, if a file or software is advertised to a computer 10 in a subnet, the NOMAD server 12 stores details of a download to a download master in the subnet after the download has occurred. Those details may be initially stored during the download. As described above, the download master is chosen or elected by a peer-to-peer election process carried out by the computers 10 in the subnet 4. The downloaded software is kept available in the subnet to be downloaded to other computers in the subnet without requiring it to be transmitted across the network 1. NOMAD allows a computer in a subnet to find, by an election process, another computer in the subnet which can provide the requested software.

As such, in the example of FIG. 1, every computer 10 in the subnet 4 has a NOMAD agent, i.e. program code which;
  enables the computer 10 to be a download master;
  enables the computer 10 to make an election to determine which of the computers 10 can provide software required by another of the computers on the subnet; and
  reports to the NOMAD server 12 where it is and what software is available on the computer.

Every computer may also have program code which enables the computer to Provide content such as software, separately from the election process referred to in 2) above, to a NOMAD download master on another subnet. The program code also allows a computer on a subnet to receive required software from another subnet particularly when the other subnet has been identified by the NOMAD server 12 to have the required software. A computer on one subnet can act as a passive cache of software with another machine on the other subnet being a download master.

The procedure set out above in the overview is, in one example, preceded by a procedure of attempting to download the required software to the requesting computer 10 from another computer in the subnet (or from another, closely connected, subnet as described hereinbelow) using NOMAD. If the computer(s) in the subnet having the required software is/are not awake the software will not be found.

Wake Up Agents

A wake-up agent is on every computer 10 in the subnet 4 so that every machine is capable of being chosen as the wake-up master 101 for the subnet 4. A wake-up master 101 may be designated automatically based on an election process and/or selected by the central wake-up server 14. This election process may be similar to that described above for the download master, e.g. the wake-up agents within a subnet may exchange information that allows an election based on one or more weighting criteria. The central wake-up server 14 may also use weighting criteria in this manner. These weighting criteria may include, amongst others, one or more of: time since last shut-down, computer type (e.g. desktop devices may be preferred over portable devices), time connected to the subnet, installed software (e.g. print server software may indicate a device that will be left on) etc. The election of a wake-up master may alleviate the need to manually designate a wake-up master on each subnet. In certain implementations the NOMAD agent and the wake-up agent may be provided separately; in other implementations their functionality may be provided by a common agent.

The wake-up agent may report the status of the computer to one or more of the NOMAD server 12 and the wake-up server 14: e.g. it may send status information when a computer on which the wake-up agent is installed is awoken, or if a wakeup request is sent for an already awake machine. The wake-up agent is able to issue magic packets for a particular computer when instructed by the central wake-up server 14. The wake-up agent also allows the computer to receive communications from the NOMAD server.

The designated wake-up master 101 does not power down. In one case, the wake-up agent designated as the wake-up master 101 may disable any power management plans that act to power down the computer. Additionally, in certain cases, the wake-up agents of computers that are not designed as wake-up masters may be allowed to implement power management programs, e.g. placing all inactive computers into a standby mode within an 'out-of-hours' time frame. The wake-up server 14 stores data identifying the wake-up masters of all the subnets. For example, following a peer-to-peer election process a selected wake-up agent in each subnet may notify the wake-up server 14 that it has been designed as the wake-up master 101. Alternatively, the wake-up server 14 may designate a wake-up master, e.g. based on received status data from computers 10. The NOMAD server 12 stores data identifying the computers in the subnet likely to have the requested software package as described above. That data may be stored in the database 121 of the server 12.

Every computer 10 on the subnet 4 has power state control software and hardware responsive to the magic packet as described above with reference to FIG. 2.

Although a system that uses a distributed wake-up master arrangement has been described for ease of example, in certain implementations a signal to transition from a non-active power state to an active power state may be instructed in an alternative manner, for example from one or more of the NOMAD server 12 and the wake-up server 14.

Figure 3:
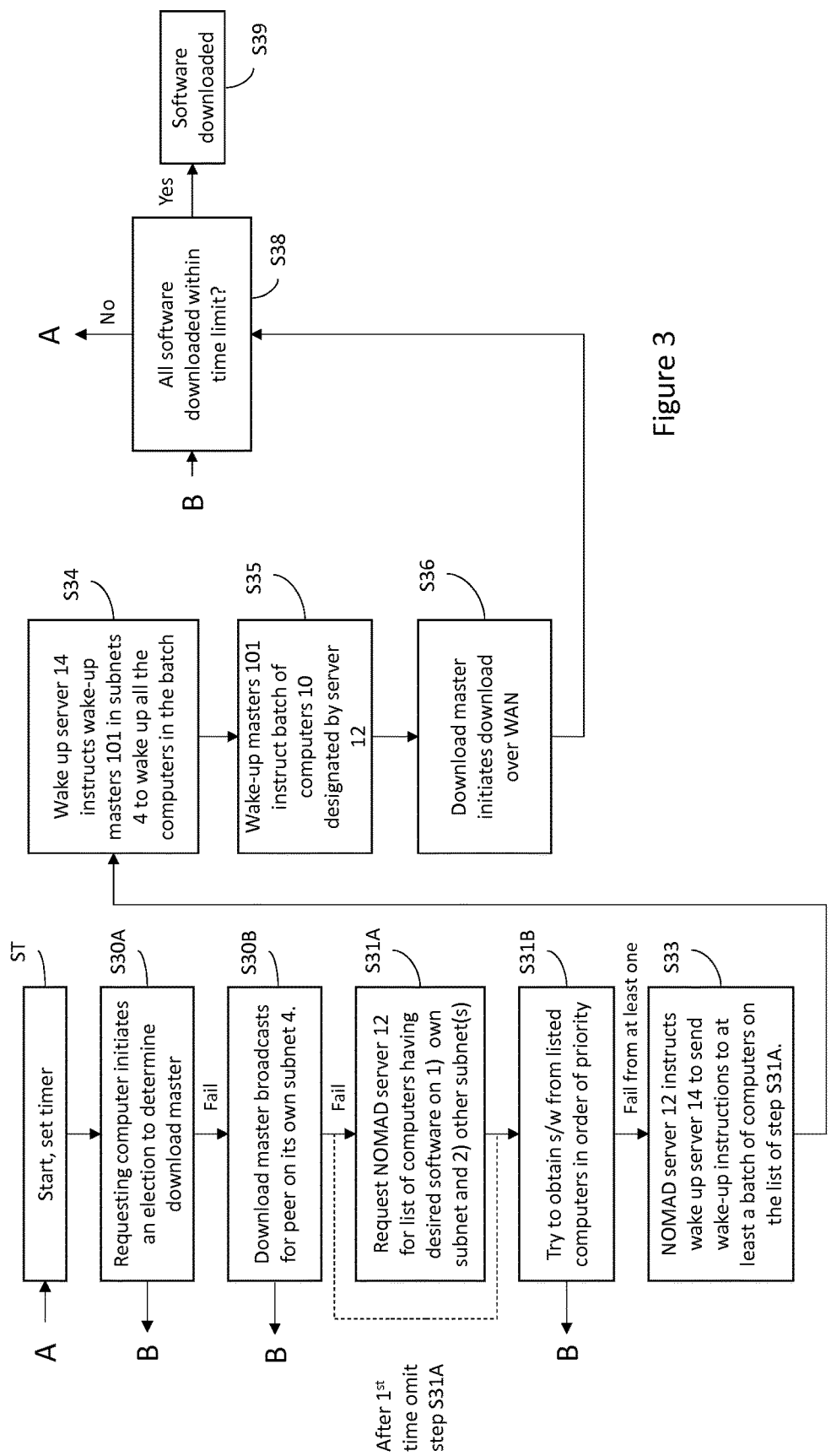
FIG. 3 is a flow chart of an illustrative method of downloading software to a computer requesting the software according to one or more embodiments of the invention.

FIG. 3—Illustrative Flow Chart of Another Example of the Invention

Step ST starts a timer which times a time limit used in step S38 and starts the procedure. The time limit is any suitable time period. One example is 5 minutes. The time limit may relate to a time out period. In certain implementations the time limit may be set implicitly, e.g. based on the time required to perform the steps of the method.

In step S30A, a procedure to download software is initiated by a requesting computer 10. The requesting computer 10 utilises the NOMAD system to perform the download. In step S30A, the NOMAD agent on the requesting computer 10 initiates an election within the subnet to identify a download master. If at least a portion of the software package is already available from another computer 10 on the subnet it may be elected as the download master and the requesting computing 10 may download this portion from the download master at B. In one case, a download master may be elected that has a greater percentage of the software package than the requesting computer 10; in this case, the portion of the software package that is available locally is downloaded from the download master. If the software is provided as a result of the election, e.g. can be downloaded to the requesting computer from a download master over the subnet (i.e. a LAN connection) the procedure proceeds at B, to step S38. Step S38 may be initiated when a portion of a software package that is available locally has been downloaded, e.g. when the remaining portion is no longer available on the subnet. Step S38 checks whether all the software has been downloaded within the time limit. If yes, the procedure ends at step S39. If not the procedure returns to step ST and a new election occurs at step S30A. In certain cases, the requesting computer 10 itself may be elected as a download master.

Once a computer in the subnet is elected as a download master, if at least a portion of the software package is not available from the subnet, then the NOMAD agent on the download master broadcasts a request for the software within its subnet at step S30B. This broadcast message may be a User Datagram Protocol (UDP) broadcast message. In one case, this may be a request for a reply from any peer on the subnet that has a greater percentage of the software package. If any subnet peer responds then the NOMAD agent on the download master attempts to download at least a portion of the available software package within the subnet and the requesting computer 10 obtains a copy of said portion via the download master. If the requesting computer 10 succeeds in fetching the software from the download master, then the procedure proceeds at B, to step S38. If no subnet peer responds then the method proceeds to step S31A.

In step S31A, if the download master in a subnet needing to download software finds no software available using the election process of step S30A or the subnet broadcast of step S30B, it issues a request to the NOMAD server 12 to indicate which computers may have the required software firstly on its own subnet and secondly on one or more closely connected subnets. The request identifies the download master, its subnet and the requested software it needs. The NOMAD server 12 provides a list of computers.

In step S31B, the download master attempts to obtain the required software from the listed computers firstly on its own subnet and secondly on other closely connected subnets. If step S31B succeeds the procedure proceeds at B, to step S38 and step S39 as described above. In step S31B, the download master attempts to download software according to an order of priority. One example of an order of priority is 1) a server, 2) a desktop machine, 3) a laptop. If step S31B succeeds then the requesting computer 10 in turn downloads the software package via the download master.

The central NOMAD server 12 has a list of which computers have which packages across the whole domain and in step S31A it selects up to a suitable number of computers, e.g. 10, that are may have the software package and that are in the same subnet as the requesting machine. The returned details may be based on data for the NOMAD server 12 indicating that certain machines had the package in the past; however, this may not necessarily mean that these machines still have the package. For example, if the cached package on a computer 10 gets deleted but no message saying so reaches the NOMAD server 12 for some reason (e.g. due to network problems), then the NOMAD server 12 may incorrectly contain data indicating that the package is still on the computer. This is one reason why a batch of machines may be selected for waking up. Another is that a computer may no longer be physically present, e.g. a portable device, for example a laptop, has been removed from the subnet. More or fewer than 10 computers may be selected from the list.

In step S33 the NOMAD server 12 sends a message to the wake-up server 14 which issues signals to wake-up masters which respond in step S34 by issuing magic packets for waking up a first batch of computers identified as likely to have the requested package. The batch may comprise 5, or any other suitable number of, computers. The batch may be, for example, the next 5 computers in the priority order list supplied by the NOMAD server 12. Computers in the subnet of the requesting computer are prioritised over computers in other closely connected subnet(s). All the computers in a batch are instructed at substantially the same time to wake up. In alternative implementations, the NOMAD server 12 and/or the wake-up server 14 may issue a wake-up signal directly without using the distributed "wake-up master" approach.

In the example of FIG. 3, step S33 if performed if a download master is unsuccessful at downloading the requested software from a computer in one or more subnets communicatively coupled to the download master, e.g. where a LAN connection is unavailable. Step S33 may be performed if the download master indicates that one or more of the computers on the list from the NOMAD server 12 are unreachable, or may simply be performed automatically following the request at step S31A, for example steps S33 to S35 may be performed, for at least one batch in response to a request to the NOMAD server 12.

Once one batch has been actioned, the procedure proceeds to step S36 wherein the download is initiated over the network 1 from the software source 18, e.g. the download is performed over a WAN rather than a LAN connection. The download at step S36 is performed by the elected download master and the requesting computer 10 in turn retrieves a copy from the download master. The method then proceeds to step S38 where a check is made to determine whether all the software has been downloaded within the time limit. If yes, the procedure ends at step S39. If not the procedure returns to step ST and a new election occurs at step S30A.

On subsequent loops of the method, e.g. if the method loops around from S38 to ST, then step S31A may be omitted if the same download master is elected. On subsequent passes through the loop additional batches of computers may be awoken using steps S33 to S35. Batches are successively actioned in sequence until either the requested software is found or the maximum configured number of computers is actioned. Using batches in this example helps to avoid waking more computers than is necessary; for example, if there are 35 computers on a list returned from the NOMAD server 12 but 80% of the time the top five ordered computers in the list are able to satisfy the download then it is not efficient waking all 35 but more efficient to wake computers in batches of five or so. If on a subsequent pass of the method, the first batch of five computers are awake but a local (e.g. LAN) download still fails, then a subsequent batch of five computers can be activated using steps S33 to S35 and on the next pass of the method a local download may be successful.

In the examples described herein, a requesting computer in one subnet may obtain or attempt to obtain software from a computer on another closely connected, subnet. "Closely connected" indicates that the other subnet is a subnet well connected with the subnet containing the requesting computer or a subnet having a fast network connection with the subnet of the requesting computer. For example the two subnets may be at the same physical site, or connected as in a LAN, or they may be at separate physical sites where the inter-site network connection is considered fast and is equivalent to a LAN.

When downloading software, the size of any data to be downloaded, such as individual files, may be known. This may be used in the determination at step S38. A hashing function may be applied to detect any corruption. As such during a download, a computer 10 may detect if anything goes wrong, such as losing a connection to a source computer, problems with fetching the data and/or corruption of the data. If a problem is detected then the download may be restarted. A restarted download may use another download source. At the end of the download, e.g. at step S39, a status message indicating success or failure may be sent to the NOMAD server 12.

In one variation of the above described examples, a small-package threshold may be applied. In this case, if the requested software is below a particular size and/or would take less than a predetermined amount of time to download, steps S33 to S35 may be disabled. This prevents computers from being woken up for downloads that may only take a short time (e.g. one loop of FIG. 3) to complete, i.e. prevents machines from being woken too late to be useful.

Examples as described herein may be implemented by a suite of computer programs which, when run on one or more computers of the network, implement the method of the present invention. For example, computer programs run on servers or other computer devices implement the method of FIG. 3. This provides an efficient technical implementation that is easy to reconfigure; however, other implementations may comprise a hardware-only solution or a mixture of hardware devices and computer programs. For example, some computers may have bespoke hardware modules. In one case, different entities may provide different aspects of the examples. One or more computer programs that are supplied to implement the invention may be stored on one or more carriers, which may also be non-transitory. Although reference is made to the download of software, the examples may be adapted to provision any form of digital content. Examples of non-transitory carriers include a computer readable medium for example a hard disk, solid state main memory of a computer, an optical disc, a magneto-optical disk, a compact disc, a magnetic tape, electronic memory including Flash memory, ROM, RAM, a RAID or any other suitable computer readable storage device.

Even though the examples above are described with reference to the provision of software, the same examples may be adapted to provide any form of digital content. The term "content" as used herein refers to, amongst others software, data, and media. The term "software" as used herein refers to any tool, function or program that is implemented by way of computer program code. In use, an executable form of the computer program code is loaded into memory (e.g. RAM) and is processed by one or more processors. As such the term "software" includes, without limitation: an operating system; application programs; patches for, and updates of, software already installed on the network; and new software packages.

The above embodiments are to be understood as illustrative examples of the invention. Further embodiments of the invention are envisaged. For example the network 1 may be a wired network, a wireless network or use a combination of wired and wireless connections. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A computer network for deploying content, the computer network comprising:
   one or more subnets, each subnet comprising a plurality of computers;
   a database storing data identifying software stored on the plurality of computers in the one or more subnets of the network and the subnet having those computers; and
   a computer arrangement having access to the database, connected by the network to the subnets and configured to respond to a request, from a computer in the one or more subnets, for the provision of content, wherein each of the computers in the subnets is configured to respond to a wake-up signal to transition the computer from a non-active power state to an active power state, and has program code which enables the computer to:

start a timer to a time limit for downloading content;
issue a request to the computer arrangement for the provision of the content;
communicate with another computer on the same subnet or another subnet selectively to receive requested content therefrom or provide requested content thereto; and
respond to an instruction from the computer arrangement to act as a wake-up master which maintains an active power state and to issue a wake-up signal to at least a first batch of computers designated by the computer arrangement, and wherein the computer arrangement has program code which enables the computer arrangement to:
respond to the request from the computer in a subnet for the provision of content with an indication of the first batch of computers, the first batch of computers being identified as having the content and being communicatively-coupled to the computer requesting the content; and
cause a wake-up master of the subnet containing the first batch of computers to issue a wake-up signal to the first batch of computers and wherein if the content is not downloaded within the time limit, the computer arrangement program code enables the computer arrangement to:
reset the timer;
respond to the request from the computer in a subnet for the provision of content with an indication of a second batch of computers, the second batch of computers being identified as having the content and being communicatively-coupled to the computer requesting the content; and
cause a wake-up master of the subnet containing the second batch of computers to issue a wake-up signal to the second batch of computers.

2. The network of claim 1, wherein the computer arrangement is configured to cause one or more wake-up masters to wake up a batch of computers at the same time.

3. The network of claim 2, wherein a computer in a subnet requesting provision of content is configured to communicate with the batch of woken computers in an order of priority.

4. The network of claim 1, wherein each of the computers in the one or more subnets is configured to carry out an election within its own subnet to elect one computer as a download master, the download master being arranged to issue the request to the computer arrangement for the provision of content if the content is not available on its own subnet, the other computers in the one or more subnets being arranged to obtain the content from the download master.

5. The network of claim 1, wherein the one or more subnets form part of a local area network.

6. The network of claim 5, wherein the one or more subnets are communicatively coupled to a content provision server via a wide area network, and wherein the program code of the computers in the subnets enables the computer to:
responsive to a determination that content is not available on its own subnet, communicate with the content provision server to receive requested content therefrom.

7. A non-transitory computer-readable medium storing a set of instructions executable by a processing resource of a computer arrangement in a computer network for deploying content, the computer network having one or more subnets, each subnet comprising a plurality of computers, the computer arrangement being connected by the network to the subnets, the instructions being configured to, when executed by the processing resource, cause the computer arrangement to:
i) respond to a request from a computer in a subnet for the provision of content to indicate to the computer a first batch of computers, the first batch of computers being identified as having the requested content; and
cause a wake-up signal to be sent to that first batch of computers, the wake-up signal being configured to transition the first batch of computers from a non-active power state to an active power state;
ii) instruct a computer in each subnet to act as a wake-up master, the a wake-up master being arranged to maintain an active power state and to issue a wake-up signal to the first batch of computers designated by the computer arrangement, and
iii) to cause a wake-up signal to be sent to the first batch of computers by instructing the wake-up master of the subnet containing the first batch of computers to issue a wake-up signal to the first batch of computers; and
if the content is not downloaded within a time limit, enable the computer arrangement to:
reset a timer;
respond to the request from the computer in a subnet for the provision of content with an indication of a second batch of computers, the second batch of computers being identified as having the content and being communicatively-coupled to the computer requesting the content; and
cause a wake-up master of the subnet containing the second batch of computers to issue a wake-up signal to the second batch of computers.

8. The medium of claim 7, wherein the instructions configure the computer arrangement to:
iv) indicate a plurality of computers in the one or more subnets that are identified as having the requested content; and
v) cause the respective wake-up masters of the one or more subnets containing the plurality of computers to issue a wake-up signal to the computers.

9. The medium of claim 7, wherein the instructions configure the computer arrangement to:
cause the respective wake-up masters of the one or more subnets containing the plurality of computers to issue a wake-up signal to the computers in a plurality of batches, wherein a wake-up signal is issued to a second batch at a second time and a wake-up signal is issued to a third batch at a third time, the third time following the second time after a given time period.

10. A method of provisioning content across a network comprising:
determining whether content is available within one or more subnets, each subnet comprising a plurality of computers;
start a timer to a time limit for downloading content;
responsive to content being unavailable within the one or more subnets, sending are request to a computer arrangement for provision of the content, the computer arrangement having access to a database storing data identifying software stored on the plurality of computers in the one or more subnets of the network and the subnet having those computers;

responsive to the request, sending an indication from the computer arrangement of a first batch of computers within the one or more subnets that are is identified as having the content;

instructing a computer to act as a wake up master which maintains an active power state;

instructing the wake up master to issue a wake-up signal to the first batch of computers, the wake-up signal being configured to transition the first batch computer from a non-active power state to an active power state; and if the content is not downloaded within the time limit, enabling the computer arrangement to:

reset the timer;

respond to the request from the computer in a subnet for the provision of content with an indication of a second batch of computers, the second batch of computers being identified as having the content and being communicatively-coupled to the computer requesting the content; and cause a wake-up master of the subnet containing the second batch of computers to issue a wake-up signal to the second batch of computers.

* * * * *